Oct. 2, 1951 — E. E. SCHIESEL — 2,569,497
COMBINED VARIABLE AREA NOZZLE AND AFTER BURNER CONTROL FOR JET MOTORS
Filed Oct. 7, 1948 — 2 Sheets-Sheet 1

INVENTOR.
ERVIN ELLIOT SCHIESEL
BY
*F. J. Schmitt*
ATTORNEY

Patented Oct. 2, 1951

2,569,497

UNITED STATES PATENT OFFICE 2,569,497

COMBINED VARIABLE AREA NOZZLE AND AFTER-BURNER CONTROL FOR JET MOTORS

Ervin E. Schiesel, Meriden, Conn.

Application October 7, 1948, Serial No. 53,323

1 Claim. (Cl. 60—35.6)

(Granted under the act of March 3, 1883, as amended April 30, 1928; 370 O. G. 757)

This invention relates to new and useful improvements in mechanism for the speed regulation of jet propelled aircraft or other vehicles by means of volumetric control of the gas discharge.

The present types of jet propelled devices are operated by the reaction from the high pressure discharge of hot gases generated by combustion. The propulsive power generated is primarily controlled by the rate of combustion, but finer regulation is desirable. In the device of this invention the secondary speed regulation is mechanically effected. This increases take-off speed and reduces landing speed.

The thrust expressed in horsepower of any jet discharged into the atmosphere is equal to the mass multiplied by the velocity. Therefore, the greater the mass at the same velocity the greater the thrust. By regulating the mass and velocity of the discharge, speed control can be effected without changing the rate of combustion.

The principal object of this invention is to provide a secondary speed control mechanism for jet-propelled aircraft by means of operable closures varying the effective area of the jet nozzle, so as to increase take-off and decrease landing speeds.

Another object of this invention is to provide adjustable means to control the mass and velocity of the jet discharge without changing the rate of combustion.

And another object of this invention is to provide quick-acting, power-operated mechanism to vary the effective area of the jet nozzle.

And still another object of this invention is to provide a jet nozzle area control mechanism that operates outside the high temperature range of the jet and is not affected operationally thereby.

A further object of this invention is to provide by means of the jet nozzle closures partly sheltered recesses in which water injection or after-burning can be used to still further boost the effective thrust of the jet.

And a further object of this invention to provide a controllably variable jet orifice mechanism adaptable to various type jet engines such as "turbojet" and "propjet," and which is simple to install and inexpensive to manufacture.

These and other objects of this invention, and the various features and details of the construction, operation and use thereof, are hereinafter more fully set forth and described with reference to the accompanying drawings, in which like numbers refer to like parts and in which.

Figure 2:
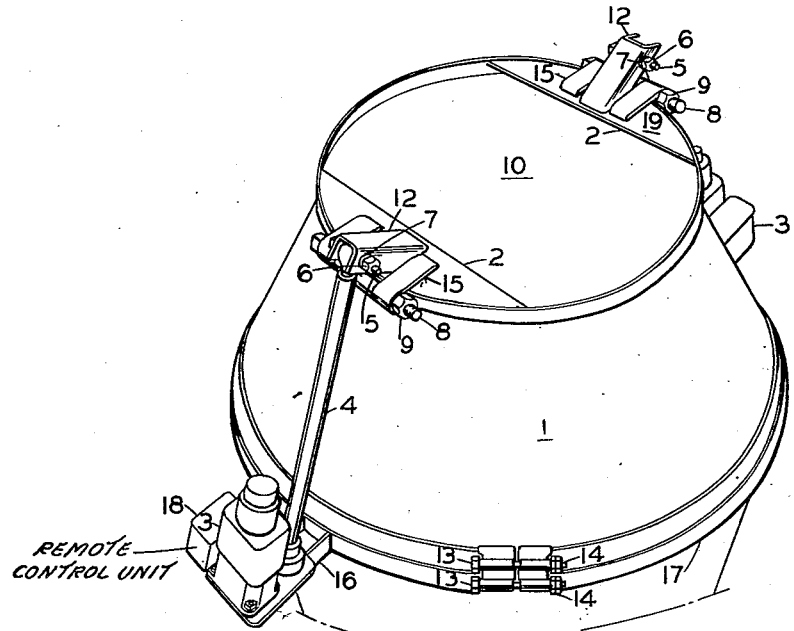
Fig. 2 is an isometric view showing the nozzle of a typical jet propulsion power plant with the circular segment-shaped closures of this invention in their closed position.
Figure 1:
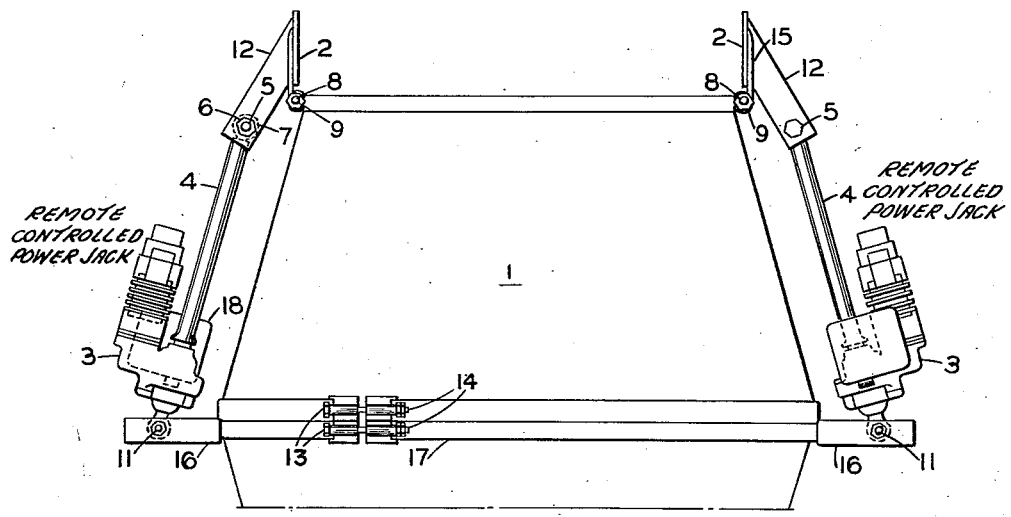
Fig. 1 is a side view showing the nozzle of a typical jet propulsion power plant with the circular segment-shaped closures of this invention.

Referring now to the drawings and more particularly to Fig. 1 thereof in which numeral 1 designates a nozzle of a typical jet propulsion power plant, and 2 the closures which are opened or closed by a remote controlled power operated jack 3, and by means of connecting tubular members 4 attached to the closure 2 by arm 12, bolts 5, nuts 6 and washers 7; and with said closures hinged to said nozzle 1 by hinge 15, bolts 8 and nuts 9, so as to pivot on bolt 8 as a center and thus open or close portions of the nozzle area 10, Fig. 2, and when closed, to form recesses 19 therebehind. Power jack 3 is of conventional design, having a piston in the tubular member 4 and a hydraulic fluid pump either actuated by self-contained electric motor (not shown) or other type of actuating mechanism, such as a solenoid pump, not here illustrated as not a part of the invention.

Bolts 11 hold in position the power operated jack 3, with its remote control unit 18, hinged on support 16 attached to nozzle 1, so as to permit operational alignment. Bolts 13 and nuts 14 clamp a circular band 17 for attaching supports 16.

Figure 3:
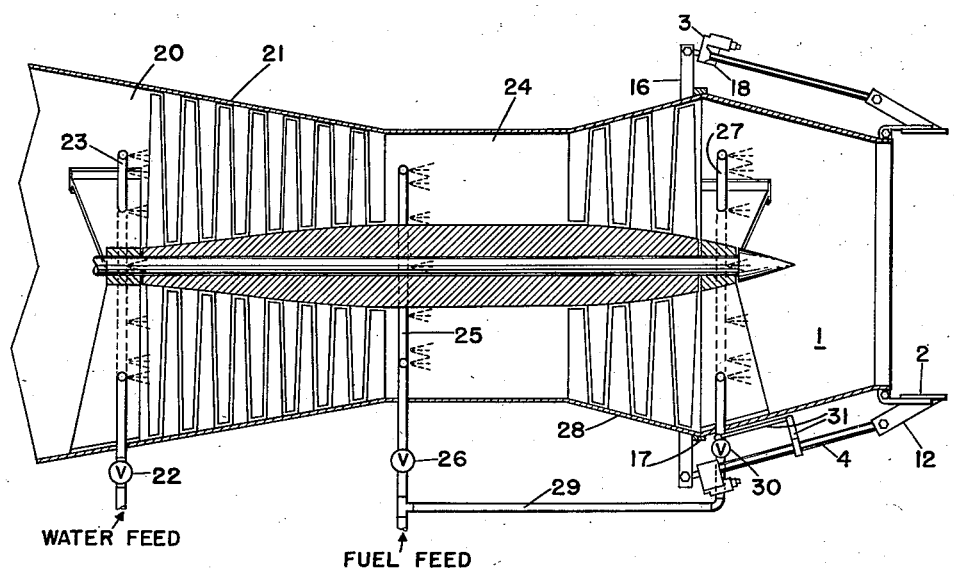
Fig. 3 is a sectional view of the power plant.

Water injection is accomplished in the inlet stage 20 of the compressor 21, by means of the control valve 22 controlling the supply of water to the injector ring 23. Fuel is fed to the combustion chamber 24 by injector ring 25 to which the fuel supply is controlled by valve 26. Fuel is also conducted to an injector ring 27 in the nozzle 1 preferably at the discharge from the turbine 28, by fuel feed line 29, and is controlled by valve 30, which may be operated in unison with the operation of the segment-shaped closure flaps 2 through linkage 31 (Fig. 3). The combustion of fuel in the nozzle is known as afterburning.

Both of the power boosting methods defined above; viz., the water injection for generation of steam in the combustion chamber, and the after-burning, are dependent upon a variable tail pipe nozzle for their successful operation. Both of these methods will yield additional power only if the mass of gases can be increased at the same critical exhaust gas velocity. This can be accomplished only by opening the nozzle to allow the increased mass of gases to be discharged when this extra power is needed, and closing the nozzle for normal cruising when the extra power is not desired.

The above explanation will help to explain how increased take-off power can be accomplished without sacrificing cruising radius. The boost power can be used during take-off with the nozzle wide open and the jet engine at normal maximum output. As soon as the boost power is no longer necessary, the flaps are closed and the normal engine power is available. Opening the flaps and using the boost power provides increased take-off power and speed. Decreased landing speed is accomplished somewhat in the same manner, except that the boost power is not utilized. In normal carrier approaches the jet propulsion engines must be throttled back to slow up for the approach. They cannot be slowed down too far, because in case of a wave-off the increased power would not be immediately available due to the length of time necessary to bring the turbine rotor up to speed. In the present devices, by utilizing the nozzle wide open and the turbine at full rotor speed, in the approach, a minimum of thrust is used and brings about a low landing speed without the limitations in the conventional jet engine speed and thrust. Should a wave-off occur, the flaps need only be actuated to closed position, and the exit gas velocity is almost immediately increased without the need to wait for the turbine to gain speed.

It is understood that various modifications and changes may be made in this invention without departing from the spirit and scope thereof as set forth in the appended claim.

The invention described herein may be manufactured and used by the Government of the United States of America for governmental purposes without the payment of any royalties thereon or therefor.

What is claimed is:

A speed control for a jet propulsion engine having an after-burner in the tail nozzle comprising a pair of flaps movably hinged to the tail nozzle and operable to reduce the effective opening thereof, a pair of hydraulic jacks pivotally secured to said tail nozzle, arms connecting each jack to each flap, means for actuating said jacks, a control valve in the fuel line to said afterburner, and means connecting one of said arms with said control valve for simultaneous or selective operation of said valve and said flaps.

ERVIN E. SCHIESEL.

REFERENCES CITED

The following references are of record in the file of this patent:

UNITED STATES PATENTS

| Number | Name | Date |
| --- | --- | --- |
| 1,044,795 | Malmquist | Nov. 19, 1912 |
| 1,859,364 | Haskell | May 24, 1932 |
| 1,935,968 | Winkelmann | Nov. 21, 1933 |
| 2,354,151 | Skoglund | July 18, 1944 |
| 2,395,809 | Goddard | Mar. 5, 1946 |
| 2,411,895 | Poole | Dec. 3, 1946 |
| 2,438,998 | Halford | Apr. 6, 1948 |
| 2,520,434 | Robson | Aug. 29, 1950 |
| 2,523,842 | Oulianoff | Sept. 26, 1950 |

FOREIGN PATENTS

| Number | Country | Date |
| --- | --- | --- |
| 580,995 | Great Britain | Sept. 26, 1946 |
| 919,004 | France | Nov. 18, 1946 |